United States Patent
You et al.

(10) Patent No.: US 6,917,679 B2
(45) Date of Patent: Jul. 12, 2005

(54) METHOD FOR INTERFACE ISDN PRIVATE AUTOMATIC BRANCH EXCHANGE AND LOCAL EXCHANGE

(75) Inventors: Du Hyun You, Kyungki-Do (KR); Byoung Ho Jeong, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 676 days.

(21) Appl. No.: 09/931,167

(22) Filed: Aug. 17, 2001

(65) Prior Publication Data

US 2002/0031215 A1 Mar. 14, 2002

(30) Foreign Application Priority Data

Aug. 18, 2000 (KR) .......................................... 2000-47734

(51) Int. Cl.⁷ ................................................ H04M 7/00
(52) U.S. Cl. ........................ 379/231; 379/230; 379/232; 379/233; 379/234
(58) Field of Search ............................. 379/219, 220.01, 379/221.06, 221.12, 225, 230, 231, 232, 233, 234, 240

(56) References Cited

U.S. PATENT DOCUMENTS

| | | | | |
|---|---|---|---|---|
| 5,319,640 A | * | 6/1994 | Yamasaki et al. ............ | 370/362 |
| 5,329,581 A | * | 7/1994 | Friedes et al. ............ | 379/93.14 |
| 5,422,943 A | * | 6/1995 | Cooney et al. .............. | 379/225 |
| 5,506,894 A | * | 4/1996 | Billings et al. ......... | 379/127.01 |
| 5,515,425 A | * | 5/1996 | Penzias et al. .......... | 379/114.02 |
| 5,550,906 A | * | 8/1996 | Chau et al. ............ | 379/201.05 |
| 5,818,921 A | * | 10/1998 | Vander Meiden et al. .. | 379/225 |
| 5,835,566 A | * | 11/1998 | Cowgill .................... | 379/15.01 |
| 5,903,571 A | * | 5/1999 | Koepper et al. ............ | 370/524 |
| 6,088,438 A | * | 7/2000 | Yoo ........................... | 379/225 |
| 6,141,343 A | * | 10/2000 | Nagayama et al. ......... | 370/357 |

* cited by examiner

Primary Examiner—Bing Q. Bui
(74) Attorney, Agent, or Firm—Fleshner & Kim, LLP (57) ABSTRACT

A method for interface an IPABX and a local exchange includes the steps of: processing a call originated from an IPABX by a local exchange having one discernible individual by binding a plurality of data transmission lines, that is, a data transmission line trunk group; and processing a call destined to the IPABX through the local exchange. Since the directory number can be managed by a group name, stepping up from the method for fixing the directory number to the line, the expense for the line can be reduced. In addition, the problem of separation between the origination line and the destination line as in the conventional method that the trunk line and the PRI line are together used is settled. Moreover, since there is no need to allocate an additional signaling point, an expense possibly incurred for the allocation of a signaling point and consumption of the signaling point resource can be prevented.

21 Claims, 5 Drawing Sheets

METHOD FOR INTERFACE ISDN PRIVATE AUTOMATIC BRANCH EXCHANGE AND LOCAL EXCHANGE

BACKGROUND OF THE INVENTION

1. Field of the Invention

The present invention relates to a method for interface an ISDN private automatic branch exchange (IPABX) and a local exchange, and more particularly, to a method for interface an IPABX and a local exchange using a primary rate interface (PRI) line.

2. Description of the Background Art

In general, a basic rate interface (referred to as 'BRI', hereinafter) and the primary rate interface (referred to as 'PRI', hereinafter) lines are used for an ISDN subscriber line service.

The BRI provides a user with two 64 Kbps B-channels and one 16 Kbps D-channel, and the PRI provides the user with 'n' number of B-channels (64 Kbps) and one D-channel (16 Kbps), of which a 23B+D interface is used in North America while a 30B+D method is used in Europe.

In spite of its high economical efficiency and line efficiency compared to those of the BRI line, the PRI line has the following problems.

Conventionally, there are two methods for interface an ISDN private automatic branch exchange (IPABX) and a local exchange by using the PRI line: one uses only the PRI line, and the other uses the PRI line and a trunk line together.

Figure 1:
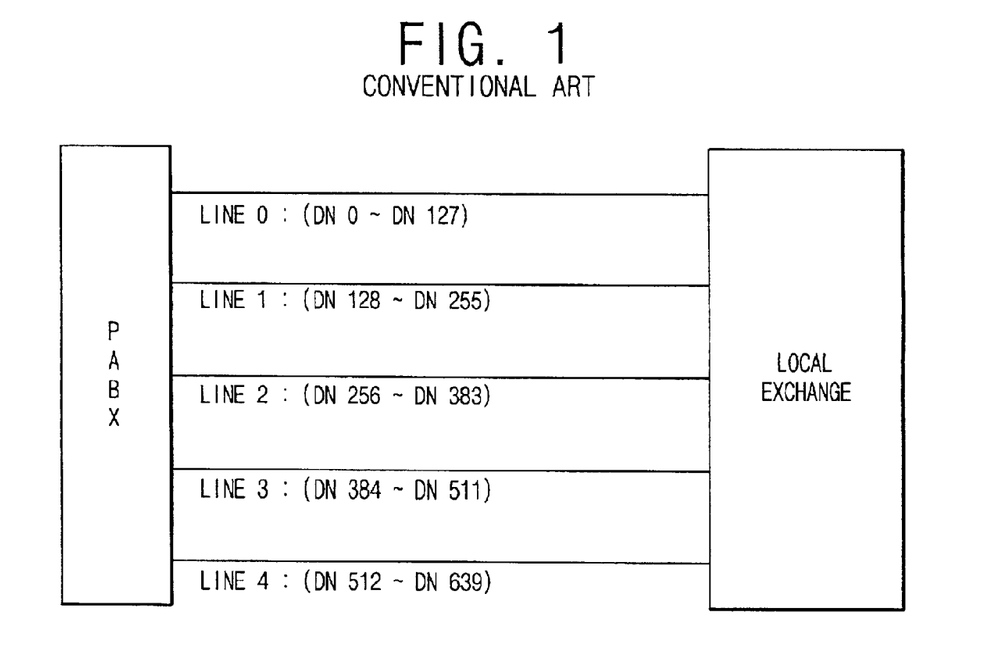
FIG. 1 is a schematic block diagram showing that an IPABX and a local exchange are matched with only PRI lines in accordance with a conventional art.

FIG. 1 is a schematic block diagram showing interface between the IPABX and the local exchange only with the PRI lines.

As shown in FIG. 1, in case of interface them with only the PRI lines, a directory number is fixed for a specific PRI line. Accordingly, if every channel of a corresponding line is in use, even though there exists an idle channel in a different line, a call does not possibly proceed, and every directory number of the IPABX should be managed by the local exchange. In the past, fixing the directory number to one PRI line is because the conventional subscriber constructing system is operated mainly for the line management.

Another problem of the system is that the PRI line retains only information on the subscriber directory number without a provider name or other information, and especially, in case of assigning a dedicated local number to the IPABX, the number resource would be inevitably consumed.

Figure 2:
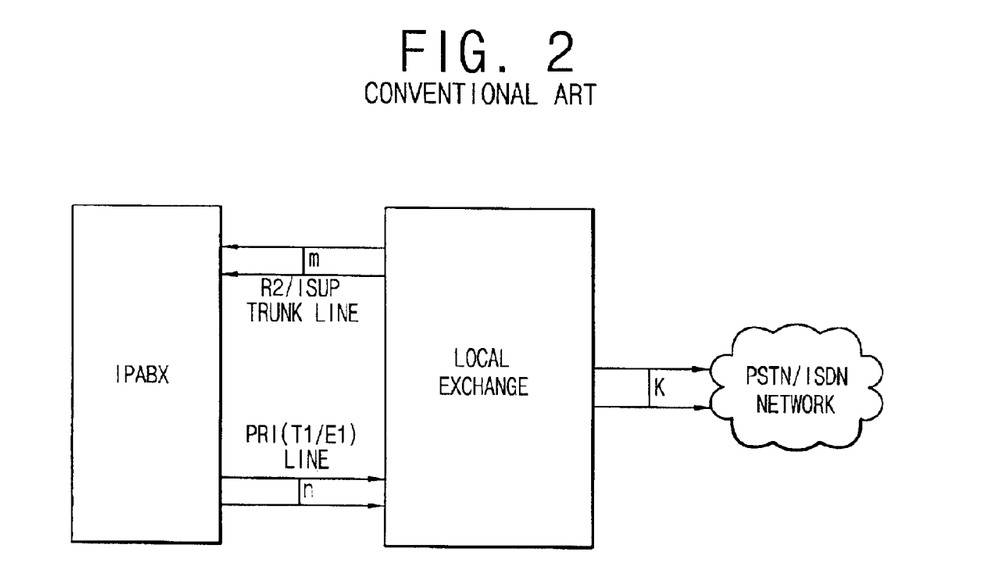
FIG. 2 is a schematic block diagram showing that the IPABX and a local exchange are interfacing by using a PRI line and a trunk line together in accordance with the conventional art.

FIG. 2 is a schematic block diagram showing that the IPABX and the local exchange are matched by using the PRI line and the trunk line.

As shown in FIG. 2, the PRI line is constructed as a transmitting terminal and an R2 or an ISUP trunk line is constructed as a receiving terminal in consideration of a line efficiency, but, the problem in this connection is that since the transmitting line and the receiving line are to be separately constructed, causing much expense for the local exchange or the IPABX to install an additional line.

In addition, in order to terminate a call from the local exchange to the IPABX, the trunk line is used, so that a prefix must be exclusively assigned to the IPABX, or otherwise, a routing directory number for transmitting a part or the whole of subscriber's number to an outgoing line.

In general, phone number ("123-4567") is consisted of a number of seven figures. Three figures ("123") of the front are pre-fix and the remaining figures ("4567") are subscriber's number.

In case of assigning the prefix exclusively, if there are not many subscribers accommodated to the IPABX, the number resource is consumed. On the other hand, using the routing directory number brings about an inconvenience of data management at the side of the local exchange and consumption of a directory number managing table.

The interface method using only the PRI lines of FIG. 1 has something to do with the PRI line service within the local exchange.

The conventional local exchange is able to register the maximum 128 directory number for one PRI line, and the directory number is assigned by using a intra-office number assigned to the local exchange directly interworking with the IPABX.

At this time, in order to 1280 subscribers to interwork with the IPABX, 10 PRI lines should be used, but its economical efficiency is degraded due to an increase in the line expanse. Thus, a construction of a network as shown in FIG. 2 is proposed.

However, as mentioned above, in case of using the trunk line as a destination line, a prefix should be used to be dedicated for the trunk line, or an additional routing directory number should be used to construct a subscriber number.

In case of the ISUP trunk line, an additional signal point should be assigned for the IPABX, while, in case of the R2 trunk line, an ISDN data cal is not possibly provided.

In case of assigning a local number separately for a specific local IPABX, the number resource is possibly consumed. In addition, even in case of terminating a call by using a subscriber number to be destined to the IPABX, a capacity of a number translation data base is increased, so that the number of a directory number which can be accommodated to the local exchange would be limited.

Moreover, since a call proceeding is not controlled (prohibition or allowance) by channels for the PRI lines, it is difficult to maintain and repair the lines.

The above references are incorporated by reference herein where appropriate for appropriate teachings of additional or alternative details, features and/or technical background.

SUMMARY OF THE INVENTION

Therefore, an object of the present invention is to provide a method for interface an ISDN private automatic branch exchange (IPABX) and a local exchange that is capable of effectively operating and managing a local switching network without replacing a PRI line being currently used or adding a switching facility.

To achieve at least the above objects in whole or in parts, there is provided a method for interface an IPABX and a local exchange, including the steps of: processing a call originated from an IPABX by a local exchange having one discernible individual obtained by binding a plurality of PRIs, that is, a PRI trunk group; and processing a call destined to the IPABX through the local exchange.

In the method for interface an IPABX and a local exchange of the present invention, the call originating step includes: receiving an external connection code from an IPABX subscriber; transmitting a set-up message to a local exchange after receiving the external connection code; checking an origination number of the set-up message received by the local exchange; collecting and translating a subscriber's number if the origination number is effective; searching a route sequence corresponding to the translated number and a trunk line to terminate a call to a local subscriber or route a call to another exchange.

In the method for interface an IPABX and a local exchange of the present invention, the call terminating step includes: translating the origination number transmitted from a caller by a local exchange; searching out a first PRI line connected to a pertinent IPABX and transmitting a 'PRI trunk line occupancy request signal' to a subscriber service processor (SSP) managing the PRI line, after the number translation; searching a PRI line having an idle channel among the PRI lines of the SSP; establishing a call to the IPABX with the PRI line; and transmitting a ring to the final destination terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Compared to the conventional art in which the directory number is fixed to the line, in the present invention, a plurality of PRI lines are bound to one group for interface a local exchange and an IPABX, thereby to generate a discernible individual. This is called a PRI trunk group, to which one or more pre-digits may be assigned.

That is, the PRI trunk group is a conceptual device generated by binding only PRI lines of the same pre-digits among PRI lines which connect the local exchange and the IPABX. And in order to give the plurality of PRI lines a form of the conceptual device as the PRI trunk group, a connection relation of the PRI lines linking the IPABX, SSP and SNP is defined in a database of the PRI trunk group.

The local exchange should newly set matters such as a group name of the generated PRI group, whether a tone is to be provided, a digit transmitting method, a charging method. The setting and changing is made with a control command called man-machine interface command (MMC) by an operator of the local exchange.

The pre-digit is assigned to each of the generated PRI trunk group to identify them and registered in a database.

The pre-digit may include only a prefix or a prefix plus a part of a subscriber's number. The prefix is a local number assigned to the local exchange.

The group name merely has a conceptual meaning, and the PRI trunk group is not recognized by the set name.

The tone is provided to determine whether a secondary dial tone is to be provided to the IPABX subscriber.

The digit transmitting method is to determine whether the destination number is to be collectively transmitted or individually transmitted.

The charging method is to determine whether telephone charges are to set as an individual charge or as a representative charge. The representative charging refers to a method for assessing telephone charges on a representative subscriber number of the IPABX and the individual charging refers to a method for assessing telephone charges on subscriber numbers of the IPABX.

Figure 3:
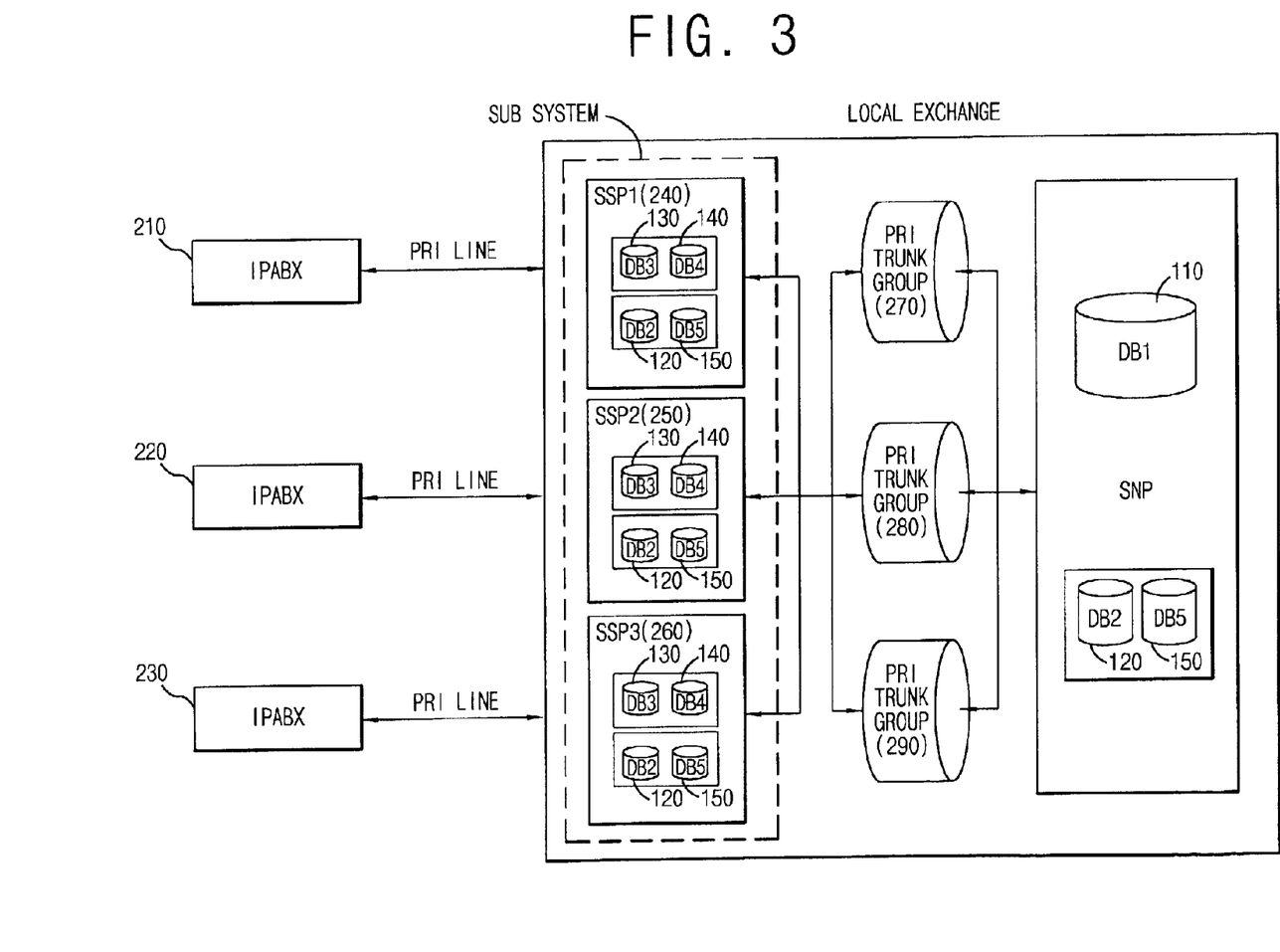
FIG. 3 is a drawing illustrating the construction of a database of a PRI trunk group in accordance with a preferred embodiment of the present invention.

FIG. 3 is a drawing illustrating a database of the PRI trunk group in accordance with a preferred embodiment of the present invention.

As shown in FIG. 3, a database of the PRI trunk group is mounted in both a subscriber service processor (SSP) and a switching & number translation processor (SNP), or mounted in one of them.

The database of the PRI trunk group comprises a line number information DB 110 of each PRI trunk group allocated to SSPs, a PRI trunk group information DB 120, a SSP line information index DB 130 per PRI trunk group, a PRI trunk group line information DB 140 of the SSP and a pre-digit information DB 150 of the PRI trunk group of the SSP.

The SSP is a main processor controlling a sub-system of a subscriber, and the SNP is a processor related to translating of the prefix and switching.

The PRI trunk group information DB 120 stores a group name or information on whether a tone is to be provided.

As aforementioned, the pre-digit is created with only a prefix or a prefix plus a part of the subscriber's number, information on which is stored in the pre-digit information database 150 of the SSP.

If the pre-digit is made with only a prefix, it signifies that a corresponding IPABX has been assigned an exclusive prefix. If the pre-digit is made with a prefix and a part of a subscriber's number, it signifies that a corresponding IPABX and a general subscriber are accommodated to the pre-digit.

The number of the PRI trunk group receivable to the local exchange is the maximum 128, and the number of PRI lines allocated in the PRI trunk group is available up to 128.

Each PRI trunk group should include at least one pre-digit for identification and may have the maximum 10 pre-digits. The pre-digit may be additionally registered according to the number of subscribers accommodated to the IPABX.

Figure 4:
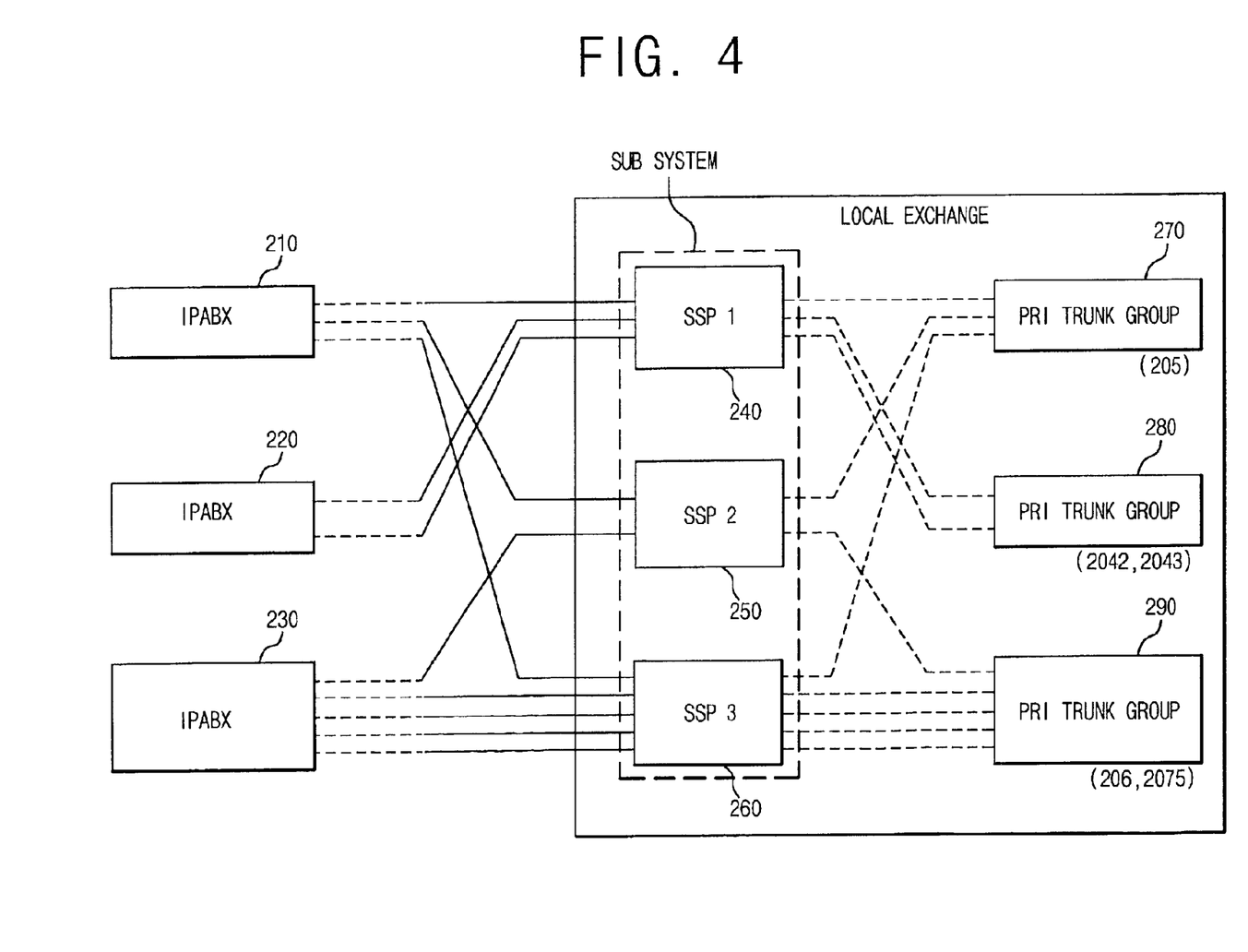
FIG. 4 is a drawing illustrating a network of an IPABX and a local exchange for the PRI trunk group in accordance with the preferred embodiment of the present invention.

FIG. 4 is a drawing illustrating a network of an IPABX and a local exchange for the PRI trunk group in accordance with the preferred embodiment of the present invention.

As shown in FIG. 4, the local exchange includes subsystems 240, 250 and 260 and three PRI trunk groups 270, 280 and 290, and is connected to three IPABXs 210, 220 and 230 with PRI lines.

There are three lines in the PRI trunk group 270 and a pre-digit is 205. There are two lines in the PRI trunk group 280 and pre-digits are 2042 and 2043. There are five lines in the PRI trunk group 290 and pre-digits are 206 and 2075.

If the pre-digit is made only with a prefix, the PRI trunk group 270 accommodates total 10,000 subscribers from 2050000 to 2059999.

If the pre-digit is made with a prefix and a part of a subscriber's number, the PRI trunk group 280 accommodates total 2,000 subscribers from 2042000 to 2043999.

If the pre-digit includes both a case of being made only with a prefix and a case of being made with a prefix and a part of a subscriber's number, and accommodates total 10,000 subscribers from 2060000 to 2069999 and from 2075000 to 2075999.

Compared to the conventional art in which the directory number is fixed to the line, in the present invention, the lines between the units 240, 250, 260, 270, 280 and 290 of the local exchange connected to the IPABXs are operated like the trunk line, so that the load control on the sub-systems 240, 250 and 260 is possibly performed, and thus, the lines can be operated more effectively.

Figure 5:
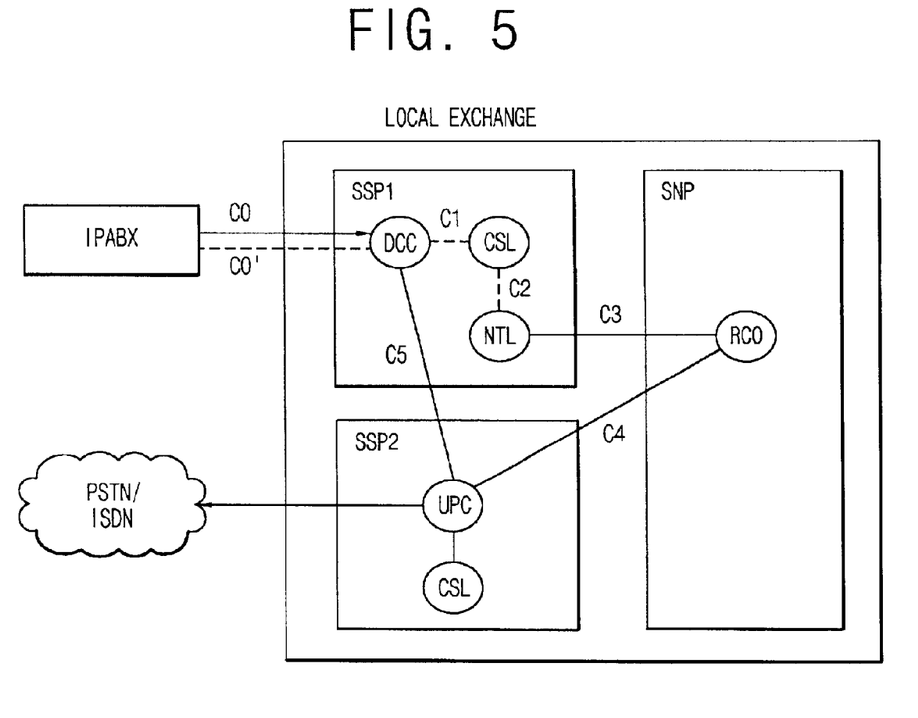
FIG. 5 is a schematic block diagram showing processing of a signal originated from the IPABX in accordance with the preferred embodiment of the present invention.

FIG. 5 is a schematic block diagram showing processing of a signal originated from the IPABX in accordance with the preferred embodiment of the present invention, that is, a case in which an arbitrary subscriber of the IPABX transmits a signal to an arbitrary subscriber of a local station or another exchange through the local exchange.

When a subscriber picks up a telephone receiver to initiate a call, a first dial tone is transmitted to the receiver. Then, the subscriber presses down an external connection code to attempt a call (for example, number '9').

Upon receipt of the external connection code, the IPABX occupies a line in a normal state with an idle channel among PRI lines connected to the local exchange, and transmits a set-up message (that is, a call initiation message) to the local exchange in conformity to a Q.931 procedure of the ITU-T recommendation (C0). Transmission of the set-up message signifies information that a call will be initiated.

The set-up message is received by a digital circuit control (DCC) of the local exchange.

The DCC, a call control block of an ISDN subscriber and the PRI trunk group, determines whether the line transmitting the set-up message is available, and operates in the following manners according to a charging system.

If a corresponding PRI trunk group is an individual charging system, the DCC receives the set-up message, determines whether there is an origination number. If there is an origination number, the DCC performs a validity check of the origination. If, however, the origination number is not effective from the validity checking on the origination number, the DCC transmits a call release message to the IPABX to terminate the call.

The origination number validity checking is to compare the origination number to a corresponding pre-digit to check whether the number, the order of the number and the length of the number are identical to each other.

Meanwhile, if the PRI trunk is the representative charging system, the IPABX determines only whether there exists an origination number. If no origination number exists, the exchange transmits a call release message to the IPABX.

While the IPABX transmits the set-up message, if it does not allocate a channel, the local exchange arbitrarily allocates a channel, and if a channel allocated by the IPABX or the exchange itself is not effective, the local exchange releases a call.

In addition, in order to prevent an allocated channel from being repeatedly allocated for a different call, the local exchange switches the state of the allocated channel from an 'idle mode' to an 'occupied mode' in a channel management table of the PRI line upon receipt of the set-up message.

After the channel allocation, the local exchange checks whether a subscriber's number is contained in the set-up message.

The digit transmission method includes an enbloc method in which all subscriber's number are carried on a set-up message, and an overlap method in which a subscriber's number is not carried on a set-up message, or otherwise, only a part of the subscriber's number is carried on the set-up message.

In case of the overlap method, the DCC transmits a response signal to the set-up message to the IPABX and hands over the allocated channel number. At this time, the DCC provides a dial tone (a secondary dial tone) to the IPABX, signifying a request of transmission of a subscriber's number (The dial tone is provided according to tone information designated in the MMC).

Upon receipt of the request of a subscriber's number, the IPABX subscriber depresses the subscriber's number so as to be transmitted to the DCC. As the DCC completely receives the subscriber's number and number translating is ready, the dial tone is stopped from being provided and the number translation is performed.

For the number translation, the DCC renders a call service library (CSL) to call an 'overlap method number translation library' of a number translation library (NTL) (C1, C2). The follow-up procedure is the same as the call processing procedure for a general ISDN subscriber.

In case of the enbloc method, the local exchange transmits a 'call proceeding message' to the IPABX (C0'), and renders the CSL to call an 'enbloc method number translation library' of the NTL for a prefix translation (C1, C2). The follow-up procedure is the same as the call processing procedure for the general ISDN subscriber.

The call processing procedure of the general ISDN subscriber after the number translation will now be described.

After the number translation, the NTL transmits a 'trunk route occupancy request signal' to a route control processor (RCO) (C3) and a signal informing that the number of the translated signal proceeds externally, to the DCC.

Upon receipt of the trunk route occupancy request signal, the RCO searches a route sequence to identify that the route of a corresponding call is an ISUP route, and transmits a 'PSTN/ISDN relay line occupancy request signal' to a user party controller (UPC) (C4).

Then, the UPC searches an effective relay line and transmits line information as obtained to the DCC (C5).

When the call is terminated, the channel state is restored from the 'occupied mode' to the 'idle mode' at the time when the call is released in conformity to a call releasing procedure of Q.931 of the ITU-T recommendation.

Figure 6:
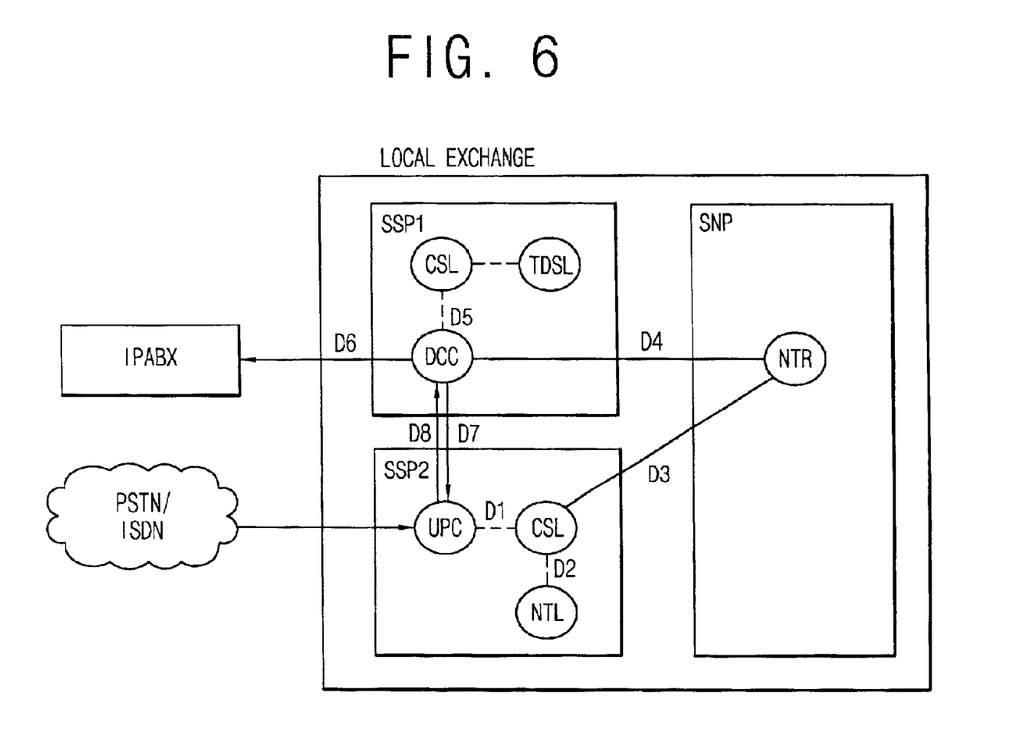
FIG. 6 is a schematic block diagram showing call terminating process of the PRI trunk group in accordance with the preferred embodiment of the present invention.

FIG. 6 is a schematic block diagram showing processing of a destined call of the PRI trunk group in accordance with the preferred embodiment of the present invention, that is, a case that an arbitrary subscriber of a local or another exchange transmits a signal through the local exchange to an arbitrary subscriber of the IPABX.

The local exchange differently processes a case (270) that the pre-digit of the PRI trunk line for terminating a call is made only with a prefix and cases (280, 290) that the pre-digit of the PRI trunk line is made with a prefix and a part of a subscriber's number.

In the case (270) that the pre-digit of the PRI trunk line for terminating a call is made only with a prefix, when the exchange receives a prefix and recognizes the pre-digit, a number translation processor (NTR) searches a first PRI line connected to a corresponding IPABX and transmits a PRI trunk line occupancy request signal to a corresponding SSP which manages the PRI line.

In most cases, the remaining phone number (the subscriber's number) are completely received and its translation is requested to the NTR. If, however, the corresponding prefix is recognized a pre-digit, the NTR may transmit the PRI trunk line occupancy request signal to the corresponding SSP even before the remaining phone number (the subscriber's number) is translated (D4).

However, in the cases that the pre-digit of the PRI trunk line is made with a prefix and a part of a subscriber's number (280,290), NTL could hardly recognize the pre-digit only with the prefix, the exchange should translate the part of the subscriber's number after translating the prefix.

Therefore, the UPC collects the remaining number (the subscriber's number) and requests the NTR to translate the subscriber's number. After the prefix and the part of the subscriber's number are translated, the pre-digit can be recognized.

After the pre-digit is recognized, if it checked whether the received subscriber's number is equivalent to a desired digit length. If the two are equivalent to each other, the NTR searches the first PRI line advancing to the IPABX and transmits a PRI trunk line occupancy request signal to the corresponding SSP1 which manages the PRI line (D4).

Upon receipt of the PRI trunk line occupancy request signal, the DCC of the SSP1 calls the CSL to check whether there exists a line having an idle channel in a corresponding group, and then, the CSL calls a state management control library block (TDSL) to check whether the line is normal (D5). When a line having an idle channel in a corresponding group is searched, the SSP1 obtains an available channel number per line and transmits a 'destination line occupancy report signal' to the UPC (D7).

And then, when the UPC connects a line switch led from a calling party and a line switch of a called party and transmits the switch information and origination information to the DCC (D8), the DCC transmits the switch information and the call origination information to the IPABX in an enbloc method or an overlap method according to the subscriber's number transmission plan of the PRI trunk group (D6) (adapting Q.931 procedure of ITU-T recommendation) (D6). And, the IPABX selects the final destination terminal and transmits a ring thereto. The follow-up procedure is the same as the general call processing control procedure.

There are three methods in which the PRI trunk line occupancy request signal transmitted to the SSP1 is transmitted to the DCC to search a terminable idle PRI line in the SSP1: a sequential method, a circular method and a random method.

The sequential method is to sequentially search a line having an idle channel from the first line of the group.

The circular method is to store a pointer of a previously occupied line, and then search an idle channel from the next line of the pointer when a different routing is requested.

The random method is to randomly extract the registered lines to search a line having an idle channel. In order to prevent a repeated searching, lines which have already been searched are excluded from the subject of the searching.

The local exchange of the present invention stores the information on the number of allocated lines in the SSP per PRI trunk group, the PRI trunk group information, the SSP line information index per PRI trunk group, PRI trunk group line information and the pre-digit information in each database, so that when the PRI line allocated to the PRI trunk group wants maintaining and repairing, a call proceeding can be controlled (blocked or unblocked) by channels of each line.

If the IPABX attempts a call origination to a channel of which a call proceeding is placed under the ban, the corresponding call is released.

A cause of the call release is processed in conformity to Q.850 of the ITU-T recommendation. The channel under the ban with respect to call proceeding is excluded form the subject of searching when the DCC searches an idle channel for a call establishing.

As so far described, the interface method between the ISDN private switching network and the local exchange has many advantages.

That is, for example, first, since the directory number can be managed by a group name, stepping up from the method for fixing the directory number to the line, the expense for the line can be reduced.

Secondly, the problem of separation between the origination line and the destination line as in the conventional method that the trunk line and the PRI line are together used is settled.

Thirdly, since there is no need to allocate an additional signaling point, an expense possibly incurred for the allocation of a signaling point and consumption of the signaling point resource can be prevented.

Fourthly, the origination line from the IPABX and the destination line can be the same, and since a general subscriber can be accommodated to the remaining number band, not the IPABX pre-digit band, the number resource consumption can be prevented.

Finally, a plurality of pre-digits can be possibly registered for a single PRI trunk group, and since the user group can be assigned according to a number band in a large capacity IPABX, the IPABX subscriber management can be more conveniently performed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, mans-plus-function clauses are intended to cover the structure described herein as performing the recited function and not only structural equivalents but also equivalent structures.

What is claimed is:

1. A method for interface of an ISDN private automatic branch exchange (IPABX) and a local exchange, comprising:

processing a first call originated from the IPABX by the local exchange by grouping a plurality of data transmission lines to form a data transmission line trunk group; and processing a second call destined to the IPABX through the local exchange using the data transmission line trunk group.

2. The method of claim 1, wherein processing the first call includes:

receiving an external connection code from an IPABX subscriber;

transmitting a set-up message to the local exchange after receiving the external connection code;

checking an origination number of the set-up message received by the local exchange;

receiving and translating a called number if the origination number is effective; and searching a route sequence corresponding to the translated number and a trunk line to route the first call to a local subscriber or to another exchange.

3. The method of claim 2, wherein, checking the origination number includes checking whether the origination number is identical to a corresponding pre-digit or checking whether the origination number exists.

4. The method of claim 1, wherein processing the second call includes:
translating an origination number transmitted from a caller by the local exchange;
searching out a first data transmission line connected to the IPABX, and transmitting a 'data transmission line occupancy request signal' to a subscriber service processor (SSP) which manages the plurality of data transmission lines, after translating the origination number;
searching a second data transmission line having an idle channel among the plurality of data transmission lines;
establishing the second call to the IPABX with the second data transmission line; and
transmitting a call notification to a final destination terminal.

5. The method of claim 4, wherein if a pre-digit of the second call is made with only a prefix, the pre-digit is recognized before the origination number is translated, and a destination occupancy request signal is transmitted to the SSP where a final destination line of the corresponding data transmission line trunk group exists.

6. The method of claim 4, wherein the idle channel searching is performed by one of a sequential method, a circular method and a random method.

7. The method of claim 1, wherein at least one data transmission line between the local exchange and the IPABX is operated by a trunk line system.

8. The method of claim 1, wherein the first call, the second call, or both are distributed while being relayed by a plurality of SSPs.

9. The method of claim 8, wherein the local exchange makes a database for information on the number of allocated lines in the SSP per data transmission line trunk group, data transmission line trunk group information, SSP line information index per data transmission line trunk group, data transmission line trunk group line information, and pre-digit information, for relaying the first call and the second call to the plurality of SSPs.

10. The method of claim 1, wherein the local exchange sets a group name of the data transmission line trunk group, as to whether a dial tone is to be provided, a digit transmission method, or a charging system.

11. The method of claim 1, wherein a pre-digit assigned to the data transmission line trunk group includes a prefix or a prefix plus a part of a subscriber's number.

12. The method of claim 11, wherein a pre-digit including the prefix plus a part of a subscriber's number can accommodate a general subscriber and the IPABX together.

13. The method of claim 1, wherein the local exchange can register a plurality of pre-digits for one data transmission line trunk group.

14. The method of claim 1, wherein the local exchange may set up the first or second call or release the first or second call for each channel of a data transmission line.

15. The method of claim 1, wherein the data transmission line trunk group does not include a signaling point.

16. An interfacing apparatus between an ISDN private switching system and a local exchange, comprising:
an IPABX for originating and terminating a call through a data transmission line connected to the local exchange;
a plurality of SSPs for controlling each of a plurality of sub-systems for an originated call or a terminated call to be distributed;
a switching and number translation processor (SNP) for translating a prefix of the originated call or the terminated call and performing switching in association with the SSP;
a data transmission line trunk group for being assigned a pre-digit including a prefix or a prefix and a subscriber's number, generated by bundling data transmission lines having a same pre-digit among data transmission lines connecting the local exchange and the IPABX; and
a PRI trunk group database for defining a connection relation of data transmission lines linking the IPABX, SSP and SNP.

17. The apparatus of claim 16, wherein the data transmission line is operated in a trunk line system.

18. The apparatus of claim 16, wherein the local exchange can register a plurality of pre-digits for one data transmission line trunk group.

19. The apparatus of claim 16, wherein the pre-digit made with a prefix plus a part of a subscriber's number can accommodate a general subscriber and the IPABX together.

20. The apparatus of claim 16, wherein the local exchange sets a group name of a generated data transmission line trunk group, as to whether a dial tone is to be provided, a digit transmission method, or a charging system.

21. The apparatus of claim 16, wherein the data transmission line trunk group database includes a database of the information on the number of allocated lines in the SSP per data transmission line trunk group, a data transmission line trunk group information database, a SSP line information index database per data transmission line trunk group, a data transmission line trunk group line information database, and a pre-digit information database.

* * * * *